UNITED STATES PATENT OFFICE.

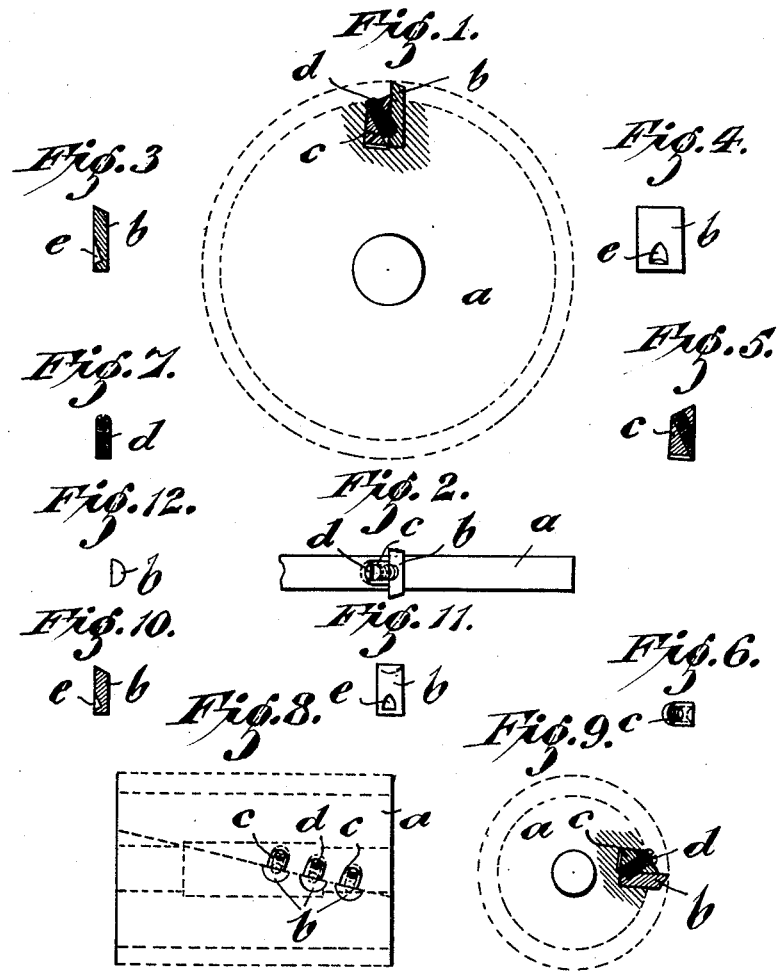

RALPH MILLER, OF BIRMINGHAM, ENGLAND.

MILLING AND LIKE CUTTING TOOL.

1,411,799.  Specification of Letters Patent.  Patented Apr. 4, 1922.

Application filed September 7, 1920. Serial No. 408,564.

(GRANTED UNDER THE PROVISIONS OF THE ACT OF MARCH 3, 1921, 41 STAT. L., 1313.)

*To all whom it may concern:*

Be it known that I, RALPH MILLER, a subject of the Kingdom of Great Britain, residing at Warwick Road, Greet, in the city of Birmingham, county of Warwick, England, have invented certain new and useful Improvements Relating to Milling and like Cutting Tools, (for which I have filed application in England, January 28, 1918, Patent No. 119,175,) of which the following is a specification.

This invention relates to milling and like cutting tools of the inserted tooth type, and has for its object to provide ready and convenient means for the more effectual affixing of the teeth or cutters to the tool holder or equivalent part.

The invention comprises the combination with a detachable tooth, blade or cutting element of a screw and nut of which the latter is adapted to react in a wedge like manner upon the cutting element.

Referring to the accompanying sheet of explanatory drawings:—

Figure 1 is a sectional end elevation and Figure 2 a plan representing one type of milling tool provided with teeth or the like in accordance with this invention.

Figure 3 is an end section and Figure 4 a front elevation of one of the teeth or cutting elements.

Figure 5 is an end section and Figure 6 a plan of the wedge nut such as is employed with each tooth or cutting element, whilst Figure 7 illustrates a screw employed with the wedge nut.

Figure 8 is a plan and Figure 9 a sectional end elevation representing the application of the invention to another type of milling tool.

Figure 10 is an end section, Figure 11 a front elevation and Figure 12 a plan of one of the teeth or cutting elements employed with the tool shown at Figures 8 and 9.

The same reference letters in the different views indicate the same or similar parts.

In one convenient application of the invention in connection with a side and face milling cutter such as is illustrated at Figures 1 and 2, the periphery of the disc like holder or body $a$, has recesses or pockets formed therein for the inserted teeth. Each pocket is of such a size as to admit the tooth, blade or cutting element $b$, and also a nut or internally screwed element $c$, of which the rounded side remote from the tooth is inclined or wedge shaped to correspond with a like inclination of the rounded side or end of the pocket against which it abuts.

The screw $d$ which is inserted in the internally threaded or tapped aperture of the said nut $c$ abuts at its inner end or engages with a lateral recess $e$ near the bottom of the tooth $b$, the screw being at an acute angle with the front of the tooth or blade.

On the tightening of the screw the reaction caused by its abutment or engagement with the tooth or blade as aforesaid, sets up a wedge like action of the nut whereby the tooth or blade is rigidly and positively held in all directions, the tooth being at the same time centralized in its recess or pocket.

After the blade, tooth or inserted cutter $b$ has been thus locked in its correct position within the holder or body part of the tool, any action tending to withdraw the cutter that may be set up when the tool is in service, will automatically exert an additional tightening action of the wedge nut against the cutter, thereby the more effectually holding the same in rigid connection with the tool body.

The invention is applicable to slab milling cutters, such as illustrated at Figures 8 and 9 having inserted teeth disposed in inclined or staggered rows, of which a portion of one row is shown at Figure 8, or in other formation, and to any other type of cutting, milling, reaming and other tools having inserted or detachable teeth, blades or like elements.

What I claim as my invention and desire to secure by Letters Patent is:—

1. A tool of the type described, comprising a holder member, having a pocket, a cutting element and nut arranged in said pocket and in mutual contact, and a clamping screw readily engaged in the nut and at its inner end bearing directly against said cutting element.

2. A tool of the type described, comprising a holder member, having a pocket, a cutting element and nut arranged in said pocket and in mutual contact, and a clamping screw readily engaged in the nut and at its inner end bearing directly against said cutting element, said screw extending diagonally across the nut and said cutting element having a recess in which the inner end of said screw engages.

In witness whereof I have hereunto set my hand.

RALPH MILLER.